A. W. CASE.

PROPELLER.

No. 11,399. Reissued Jan. 23, 1894.

Witnesses:

Joseph Arthur Cantin.

Julia Stern.

Inventor:

Alfred Wells Case, by Simonds, Burdett & Frothingham,

Attorneys

THE NORRIS PETERS CO., PHOTO-LITHO., WASHINGTON, D. C.

UNITED STATES PATENT OFFICE.

ALFRED WELLS CASE, OF HIGHLAND PARK, CONNECTICUT.

PROPELLER.

SPECIFICATION forming part of Reissued Letters Patent No. 11,399, dated January 23, 1894.

Original No. 496,857, dated May 9, 1893. Application for reissue filed October 16, 1893. Serial No. 488,349.

*To all whom it may concern:*

Be it known that I, ALFRED WELLS CASE, a citizen of the United States, and a resident of Highland Park, in the county of Hartford and State of Connecticut, have invented certain new and useful Improvements in Propellers, of which the following is a full, clear, and exact specification, whereby any one skilled in the art can make and use the same.

The invention relates to the class of screw propellers that are adapted to be attached to the stern of a boat for driving the same, the object of the invention being to provide a simple propeller of this class so shaped that when in motion the blades will act upon and throw the water in such manner that the utmost resistance possible to the thrust of the blades is utilized to obtain the greatest power of the screw.

To this end the invention resides in a propeller having all its blades formed as to the working surfaces by a generatrix substantially straight from the root of the blade or the bottom end of the working surface to the tip of such blade and surface, and with such working surface forwardly inclined, as more particularly hereinafter described and pointed out in the claims.

Figure 2:
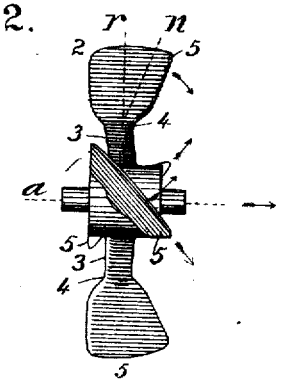
Figure 3:
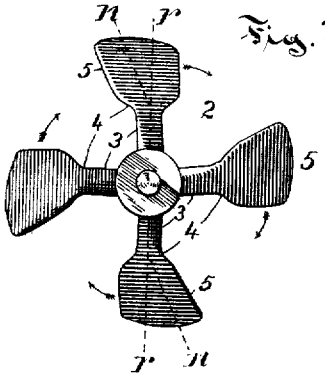
Figure 1:
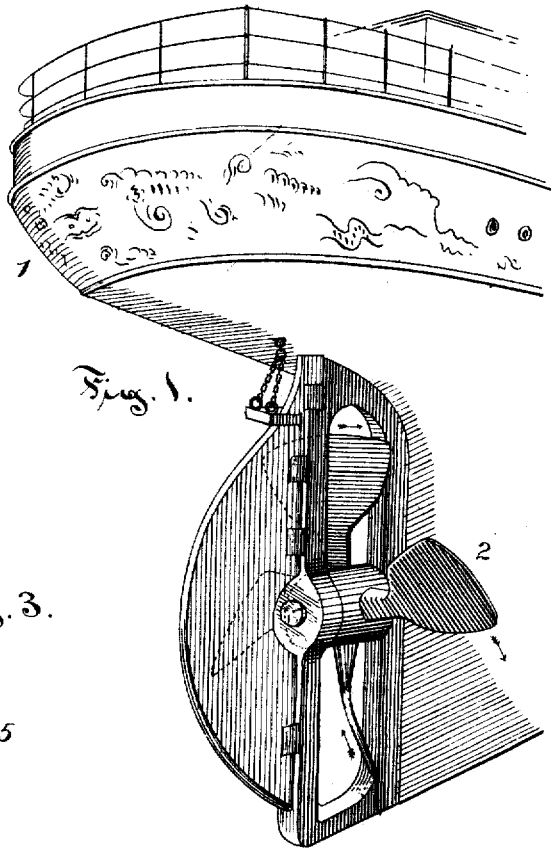

Referring to the accompanying drawings: Figure 1 is a view of the stern of a steamer, showing the improved propeller in perspective. Fig. 2 is a view of the propeller looking directly from the side; and Fig. 3 is a view looking directly from the stern.

In the views 1 indicates the stern of a boat the post of which supports the end of the shaft to which the propeller 2 having any desired number of blades is secured. In the form shown there are four blades, each having a shank 3 that projects from the hub, a throat 4 at the end of the shank, and driving wings or lobes 5 at the outer ends. These blades are formed with their lobes flat and set on a screw pitch, but may be formed curved, if desired, and set on any pitch of the correct degree to drive with the least amount of resistance for the speed required; and although the shanks 3 project radially from the hub when this form of blade as a whole is used, the working surface of each blade is inclined forward from a line normal to the axle of the propeller shaft and passing through the base or inner end of the blade. The working surface of each lobe or blade as a whole is not only so inclined, but is also set on an angle across the axis of the propeller. If the lobe or fluke 5 of each blade shall be considered as having been bent forward into its final working position at an angle with the shank from a location in line with what has been called herein a radius $r$, the direction of this forward bending motion away from such radius or line of shank prolonged, would be substantially at right angles with the line of movement developed by the forward rotary movement of any point in such radius as the screw revolved, in the form of blade herein illustrated and described.

In the views the dotted line $a$ indicates the axis of the shaft, $r$ radii, and $n$ the inclination of the blades with relation to said radius normal to the axis; while the arrows indicate the direction of movement of the propeller blade.

It is well known that the water at the stern of a fast running boat is in a disturbed state, churning, boiling, and setting back toward the vessel, particularly on the line of the axis of the propeller; and it has been the aim of most prior inventors to so construct propeller screws that the blades will collect the disturbed water and compact the same at the center in line with the axis, thinking that thereby the compacted water will offer a greater resistance to the thrust of the screw blades and increase the power of the propeller. Others have endeavored to not only collect the water at the center, but utilize the force of the water thrown centrifugally by the screw during rotation. The present invention proceeds on a principle directly contrary to these, as a propeller as herein described, with the blades placed at a suitable angle crosswise of the axis of the hub and also inclined forward, throws the water outward away from the axis and backward at the same time that it worms ahead. By this construction the volume of water churned by the screw is thrown away from the center of disturbance outward against a more solid body of water beyond the periphery of the blades, where the surrounding water is not as disturbed, and the water thrown out from the center reacts, by coming in contact with the more solid body of water beyond the disturbed center This reaction is against the blades of the screw and one resultant is a force acting forward in the direction of motion of the vessel and thus causing the water in which the screw is buried to offer greater resistance to the thrust of the screw than if the water was thrown directly astern, or gathered toward the center and thrown astern.

It has been found by careful tests of the improved wheel in actual service that it shows no negative slip, and in that particular serves to distinguish the within improvement from such screws of the prior art as have the blades with working surfaces curved forward lengthwise and more or less spherical as to the shape and configuration of the working surface; such surfaces being generated by a curved line.

I claim as my invention—

1. A screw propeller comprising a hub with projecting blades each of which has its uninterrupted working surface developed by a straight generatrix, and set on an angle across the axis of the hub and also inclined forwardly from the base of the working surface, whereby each blade operates to thrust outwardly as well as rearwardly when in motion, all substantially as described.

2. A screw propeller consisting of a hub with a plural number of projecting blades each blade having a shank terminating in a lobe or fluke, said fluke having its working surface developed by a straight generatrix, and set on an angle across the axis of the hub and also inclined forward from the base of the working surface, all substantially as described.

ALFRED WELLS CASE.

Witnesses:
CHAS. L. BURDETT,
JOS. GATH. CANTON.

Correction in Reissue Letters Patent No. 11,399.

It is hereby certified that in reissue Letters Patent No. 11,399, granted January 23, 1894, upon the application of Alfred Wells Case, of Highland Park, Connecticut, for an improvement in "Propellers," an error appears in the printed specification requiring the following correction, viz: In line 51, page 1, the word "axle" should read *axis;* and that the said Letters Patent should be read with this correction therein that the same may conform to the record of the case in the Patent Office.

Signed, countersigned, and sealed this 6th day of February, A. D. 1894.

[SEAL.]

JOHN M. REYNOLDS,
*Assistant Secretary of the Interior.*

Countersigned:

JOHN S. SEYMOUR,
*Commissioner of Patents.*